Aug. 4, 1931.  A. W. ROSEN  1,817,711

DEVICE FOR SUPPORTING ARTICLES ON TIRES OR THE LIKE

Original Filed March 22, 1928

WITNESSES

INVENTOR
Abraham W. Rosen
BY
ATTORNEY

Patented Aug. 4, 1931

1,817,711

UNITED STATES PATENT OFFICE

ABRAHAM W. ROSEN, OF NEW YORK, N. Y.

DEVICE FOR SUPPORTING ARTICLES ON TIRES OR THE LIKE

Original application filed March 22, 1928, Serial No. 263,748, now Patent No. 1,765,099, dated June 17, 1930. Divided and this application filed November 8, 1928. Serial No. 318,091.

The device of the present invention is capable of a wide range of utility as an article holder, and is peculiarly adapted and primarily intended for supporting an article such, for instance, as a mirror or other accessory on the spare tire of an automobile.

It is common practice to carry spare tires on the running board of a car in such a position that a mirror thereon may be conveniently observed by the driver, and afford a visual indication of the road behind the car.

In accordance with the present invention, I provide an improved supporting device for automobile accessories, which may readily support in adjustable position the accessory, and which may be readily supported by the tire and secured thereto by the provision of a strap passing therethrough.

Other and more general objects of the invention are to provide an accessory supporting means of this character which will be of simple, practical construction, rugged, durable and efficient in use and well suited to the requirements of economical manufacture and convenient application and removal.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein Figure 1 is a fragmentary perspective view showing a device of the present invention in operative position to support an accessory on a tire;

Figure 1:
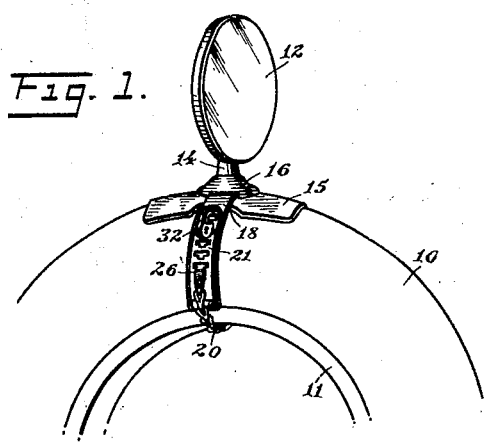
Figure 2:
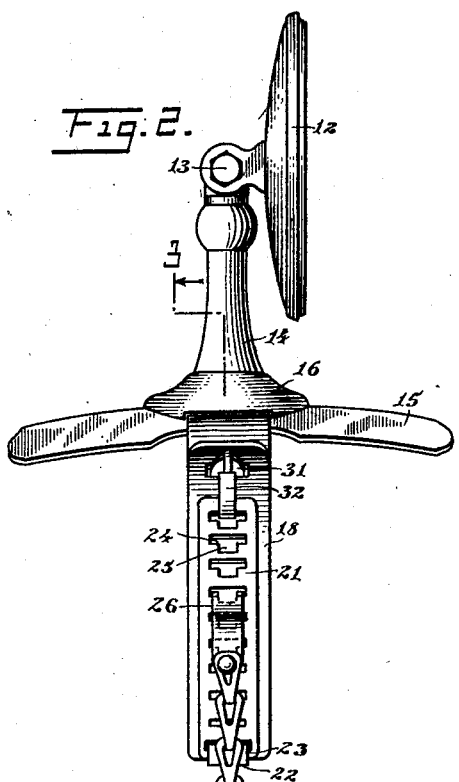
Fig. 2 is a side elevational view of the device.

The present application is filed in accordance with the requirement for division in connection with my co-pending application, Serial No. 263,748, filed March 22, 1928, which application has by amendment been directed specifically to the means for securing a device of the class described to a vehicle to prevent accidental or unauthorized removal therefrom.

In the drawings I have used the reference numeral 10 to indicate a spare tire carried on the usual rim 11, and in practice commonly mounted on the running board of a car. I have shown the article to be supported on the tire as consisting of a mirror 12 of any conventional type pivotally or universally mounted as at 13 on a standard 14, which standard is preferably hollow and integral with a supporting platform 15 longitudinally curved in accordance with the curvature of the tire. The standard and platform are joined together through a flaring, generally inverted cup-shaped section 16, having diametrically opposed slots therein through which a metal strap 18 is adapted to be passed. This strap lies against the platform and extends under the cup, and is sufficiently flexible and resilient to be conveniently slightly bent to accommodate various sizes of tires.

To one end of the strap 18 there is anchored at 19, a flexible device 20, preferably a chain, while to the other end of the strap 18 there is pivotally secured a lever 21 having a curvature which is approximately the same as the curvature of the strap. To effect convenient pivotal mounting of the lever 21, the end of the strap 18 may be conveniently reduced and bent back upon itself to form a loop 22, and the end of the lever may be slotted to provide a cross bar 23 which is received in the loop and affords the pivotal connection between the strap and lever.

The lever is provided with a series of elongated transverse openings 24, each communicating at its lower edge with a notch 25. The free end of the chain 20 carries an anchoring device in the nature of a plate 26 having a reduced neck 27 inclining away from the plane of the plate, which neck carries an offset head 28 lying approximately in the plane of the plate 26 and offset therefrom.

Figure 3:
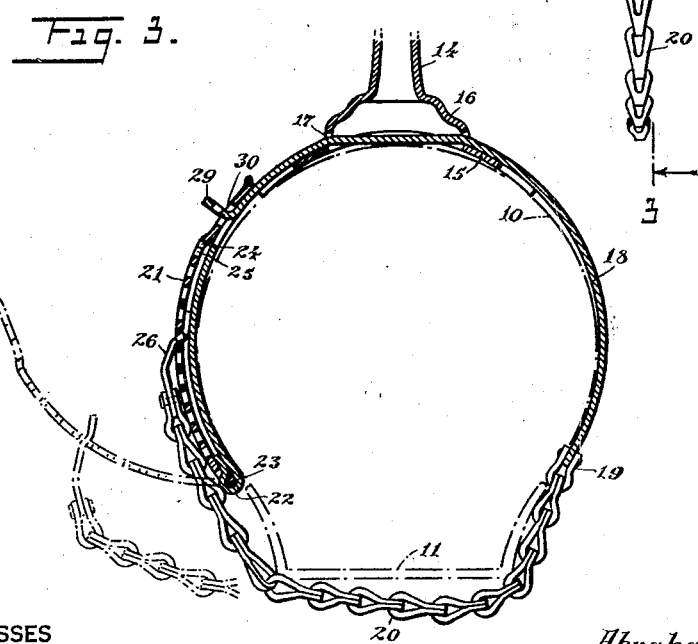
Fig. 3 is a vertical sectional view on the line 3—3 of Fig. 2.

Due to the flexibility of the strap 18, and the adjustability provided by the series of notches in the lever 21, the device may be conveniently used for attaching an article to a wide range of tire sizes. The attachment may be very easily performed without any great manual effort, and the operation is substantially as follows: Strap 18 is placed on the tire, straddling the latter, lever 21 is swung open, the head 28 of the anchoring member is inserted through the proper slot 24 as shown in dotted lines (Fig. 3). As the lever is swung back against the strap 18, the head 28 is clamped between the lever and the strap, and the chain 20 is tightened about the tire; a padlock may then be inserted through the ear 29 to complete the locking of the device against unauthorized removal.

The present invention is directed specifically to the standard 14 and its supporting platform 15, which in combination with the diametrically opposed slots for receiving the strap 18, provides a novel and improved construction. It will be understood that this feature of the present invention is not confined to use for supporting a mirror but may support other instruments, by suitable connection therewith, as at 13.

Obviously, various changes and alterations might be made in the general form and arrangement of the parts described without departing from the invention. Hence I do not wish to limit mysef to the details set forth, but shall consider myself at liberty to make such changes and alterations as fairly fall within the spirit and scope of the appended claims.

What is claimed is:

1. A rear vision mirror for automobiles, including a base having an apertured rigid, metallic body curved to conform with the tread portion of a vehicle tire, said base including a tire-wall-embracing extension comprising a longitudinally-bendable metallic band, said band being received through the apertures of the body and being bent adjacent the apertures of said body to set said band to retain it assembled with said base the band being rigid transversely to form shoulders at its side edges for engaging a tire, a mirror support rising from said body, and securing means associated with the extremities of said band to underlie a tire-supporting rim to retain the mirror on a tire.

2. In a rear vision mirror for automobiles, a support base having a platform shaped to conform with a tire, said platform having a centrally disposed cup-shaped section therein, a mirror-holding standard rising from said section, said platform having diametrically opposed strap-receiving and securing apertures therein, and a tire-embracing metallic securing-strap extending through said apertures and having the free projecting ends thereof curved downwardly to provide shoulders at adjacent points where the strap projects through the apertures for engaging the walls of the apertures to prevent displacement of the strap from the base.

ABRAHAM W. ROSEN.